(12) United States Patent
Morse (10) Patent No.: US 12,280,897 B2
(45) Date of Patent: Apr. 22, 2025

(54) CAPTURE-LESS ORBITAL DEBRIS MANAGEMENT SYSTEM (CODMS), METHOD, AND CODMS SATELLITE

(71) Applicant: Jeffrey Bruce Morse, Haymarket, VA (US)

(72) Inventor: Jeffrey Bruce Morse, Haymarket, VA (US)

(73) Assignee: widgetblender, LLC, Haymarket, VA (US)

( * ) Notice: Subject to any disclaimer, the term of this patent is extended or adjusted under 35 U.S.C. 154(b) by 0 days.

(21) Appl. No.: 17/954,144

(22) Filed: Sep. 27, 2022

(65) Prior Publication Data

US 2024/0278940 A1   Aug. 22, 2024

Related U.S. Application Data

(60) Provisional application No. 63/360,386, filed on Sep. 29, 2021.

(51) Int. Cl.
*B64G 1/56* (2006.01)
*B64G 1/24* (2006.01)

(52) U.S. Cl.
CPC ............... *B64G 1/56* (2013.01); *B64G 1/247* (2023.08)

(58) Field of Classification Search
CPC ........................... B64G 1/1081; B64G 1/1078
See application file for complete search history.

(56) References Cited

U.S. PATENT DOCUMENTS

2011/0121139 A1 *   5/2011   Poulos ................... B64G 1/646
244/169

FOREIGN PATENT DOCUMENTS

EP   3892966 A1 *  10/2021   ............... B64G 1/66

* cited by examiner

*Primary Examiner* — Philip J Bonzell
*Assistant Examiner* — Eric Acosta

(57) ABSTRACT

A method and satellite for capture-less management of orbital debris objects, include controlling a satellite having opposing thrusters to be maintained at a predetermined distance from an orbital debris object to be managed, i.e., paired with the orbital debris object. Management may include fine tracking of the orbital debris object and/or operating the opposing thrusters to apply force to the orbital debris object to generate a model of the orbital debris object, to change the attitude of the orbital debris object, to deorbit the orbital debris object, and/or breakup the orbital debris object.

22 Claims, 5 Drawing Sheets

Poor　　　　　Better　　　　　Best

CAPTURE-LESS ORBITAL DEBRIS MANAGEMENT SYSTEM (CODMS), METHOD, AND CODMS SATELLITE

CROSS-REFERENCE TO RELATED APPLICATIONS

The present application claims priority to Provisional Serial No. filed on 63/360,386, filed on Sep. 29, 2021, the entire contents of which is hereby incorporated by reference for all purposes.

BACKGROUND

The Earth is orbited by thousands of objects ranging from small paint flakes to full sized abandoned satellites and spent rocky upper stages as well as thousands of operational satellites. Non-operational objects that are no longer under any form of control are considered orbital debris, which of most dense in Low Earth Orbit, which is considered to be less than 2000 km above the Earth surface. The speed of all objects in LEO is very high, approximately 7.6 km/s, so almost any interaction between two objects will result in collision that breaks both objects into an expanding cloud of many smaller objects, increasing the debris risk, as even small objects can create additional destructive collisions. Even if a collision does not result in breakup, if one object was an operational satellite there is a good chance that the collision will disable that operational satellite. While there are over 10,000 objects of space debris in Earth's Low Earth Orbit with over 1 kg a mass, almost none have been closely inspected, and only a few have their rotational speeds estimated. No object of orbital debris has been actively characterized and removed from LEO to date. While it is not possible to reduce the orbital debris risk to zero, it is possible to reduce the risk to operational satellites and space craft though the use of many small satellites deployed as part of a management system that employs a range of functionality that minimizes the potential for orbital debris objects to strike an operational satellite or space craft.

SUMMARY

Many orbital debris object removal methods have been proposed, including direct capture by an orbital debris removal satellite with arms, nets, harpoons, magnets so that the orbital debris satellite can drag the orbital debris object to a low orbit where the pair will burn up in Earth's atmosphere. While these concepts may work, the very nature of contacting some types of orbital debris objects risks breaking up the object and creating far more debris objects than before. In addition, capture based concepts are challenged by orbital debris objects that are tumbling, since when captured the orbital debris satellite will often develop that tumbling behavior as well, making control very difficult. A few capture-less concepts have been proposed as well, but they employ low thrust very high exhaust velocity engines with expensive fuel that requires a great of deal of power to operate. These low thrust systems cannot achieve a powerful short burst of exhaust that is very useful in some aspects of orbital debris management. The most economically viable capture-less concepts will employ low cost fuel (since a lot of fuel is needed) that is non-hazardous to lower the preparation cost of ride-share launches to LEO and large fuel tanks to allow enough fuel supply to create many significant momentum transfer events to the orbital debris object. This combination of features can be most cost affordably accomplished by using water or other non-toxic liquids as fuel. There are a number of companies offering water or non-toxic liquid based thrusters with a variety of characteristics. Key characteristics for thrusters to meet CODMS goals include a high thrust, e.g., on the order to 10 mN, with thruster pulse durations from 0.1 to 2 seconds (depending on the management function being employed), a good specific impulse (between 170 and 350 seconds) and a narrow as possible exhaust cone (to maximize the number of exhaust particles that strike the closely paired orbital debris object).

According to an aspect herein, a method includes actively managing many aspects of orbital debris risk reduction with a capture-less approach to arrive as a maximum reduction in risk as the lowest possible cost with minimal risk of orbital debris object break-up or loss of control over the orbital debris removal satellite. This may be accomplished using a system that includes at least one satellites, satellite to ground communications systems and ground systems for command and control and information processing. This overall system will be referred to as Capture-less Orbital Debris Management System (CODMS). LEO satellites used within this system will be referred to as CODMS satellites.

CODMS is based on features including, first, a wholistic approach orbital debris management that goes beyond just capturing and dragging down single orbital debris object into low LEO (approximately 200 km altitude) and, second, the use of satellites with opposing engines using low cost fuel to impart force through momentum transfers on the orbital debris object without the need to capture it.

The "Management" in CODMS recognizes that risks can be orbital debris reduced in other ways than complete removal of the object (although that is a important option). The ability to closely track, measure surface quality, measure rotational dynamics and change orbital debris attitude (minimizing the cross section facing the crossing debris or maximizing the cross section the the direction of travel) all have risk reduction value as well.

The "Capture-less" in CODMS is enabled by the use of opposing thrusters that will allow the CODMS satellite to stay closely paired with the orbital debris object while one engine's exhaust can impart a force in a given direction even if the orbital debris object is tumbling. Close pairing, possibly within 2 meters, of the outer edges of both objects is needed to maximize momentum transfer efficiency to create the best force application to the orbital debris object.

DETAILED DESCRIPTION

The Capture-less Orbital Debris Management System (CODMS) employs CODMS satellites that are cubesats and/or smallsats which have become common for many operations in Low Earth Orbit (LEO). 100s of this class of satellite are now commonly launched to LEO in any given year, often on SpaceX Transporter missions designed to launch many of these smallsats and cubesats at a relatively low cost and on a regular schedule to LEO. Smallsat and cubesats benefit from a large marketplace of companies and products to create components (like thrusters, which have over 20 product options in 2022) that can be combined to create lower cost and lower risk solutions for satellites than was available before.

CODMS differs from most cubesat and smallsat designs. CODMS specifically uses two opposing thrusters with a large fuel supply to maintain long term close pairing for a number of CODMS operations. It also uses sensors that are very effective at close range operations, ranging from many km to several meters. These sensors are common for various aerospace uses, but not commonly deployed on cubesats or smallsats. Otherwise CODMS satellites will use industry standard methods and components for attitude control, position determination, solar array-based power, communications and onboard information processing.

Force, momentum and velocity are related by $$F_{net} = \frac{\Delta p}{\Delta t} = \frac{m \Delta v}{\Delta t}$$

What is important in this concept is that a force (F) needs to be applied to an orbital debris object of a given mass (m) to reduce its velocity (v) so it falls out of orbit much sooner. In Earth orbit the application of force to change velocity of a satellite is done with thrusters that accelerate some stored fuel mass to a high velocity to create a counter force due to conservation of momentum. This will increase the velocity of the satellite in the opposite direction of the velocity of the thruster exhaust. If that thruster exhaust hits another object on a face that is in the direction of travel it too will experience a change in momentum that will lower its velocity. In this equation delta t is approximately the duration of a thrusters thrust.

One CODMS function is to have the CODMS satellite stay close to the orbital debris object and report its position with high resolution based on the CODMS satellite's GPS receiver within the CODMS satellite's control circuits to create a much more precise location estimate of the exact orbit of the orbital debris object. This creates value for other satellite operators by allowing operational satellites to perform fewer avoidance maneuvers or if needed, with less fuel, if a "close approach" event between an operational satellite and the paired orbital debris object triggers the need for avoidance maneuvers. This is the minimal level of management of the orbital debris object. This extends the operational lifetime of these operational satellites. Another function is for the paired CODMS satellite to remain close and collect information about the size, shape and surface conditions of the orbital debris object. This can support decisions about how best to reduce the orbital collision risk of this object or similar classes of objects. Another function is to apply a bit of thrust exhaust to the surface of the orbital debris object and observe how it reacts. This can help to create a model of the orbital debris object's moments of inertia, which can aid in planning orbital debris object attitude modification operations. The CODMS satellite computer may build up this model over a number of short thruster pulses.

CODMS Satellites requires smallsat/cubesat placement services. 100s of this class of satellite are now commonly launched to LEO in any given year, often on SpaceX Transporter missions designed to launch many of these smallsats and cubesats at a relatively low cost and on a regular schedule to LEO.

Figure 1:
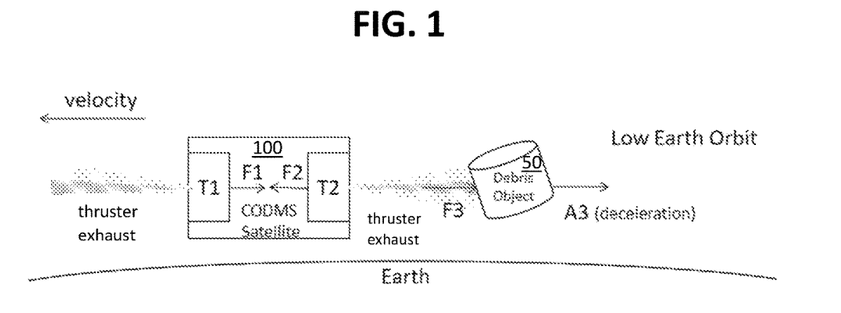
FIG. 1 illustrates a CODMS satellite near orbital debris object.

Reference is made to FIG. 1. earth is orbited by numerous orbital debris objects, e.g., an orbital debris object 50. A CODMS satellite 100 can maneuver close to the orbital debris object 50. For example, the CODMS satellite 100 may point one thruster towards the orbital debris object 50 then fire both thrusters (T1 and T2) at the same power for the same duration. Thrusters can be of various types and capacities, some are based on gases, some on solids and some on liquids. Companies and their products include AAC Clyde Space PM200 Propulsion Module (Benign nitrous oxide/propene), NanoAvionics Propulsion System EPSS C1.5 (ADN-based monopropellant), Bradford ECAPS 100 mN HPGP Thruster (LMP-103S), Dawn Aerospace CubeSat Propulsion Module 0.7U (N2O and C3H6), Busek Co. Inc. BGT-X1 (green monopropellant) and SteamJet Space Systems Steam Thruster One (a water thruster) to name a few.

Figure 2A:
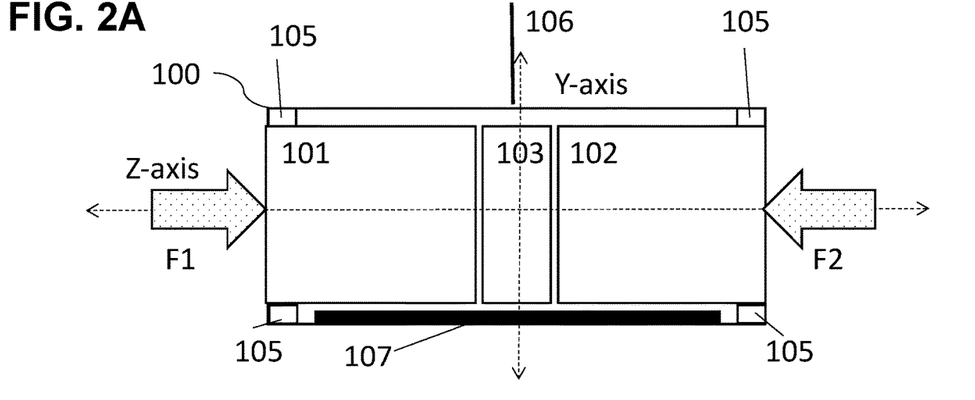
FIG. 2A illustrates a side view of a CODMS satellite according to an embodiment.
Figure 2B:
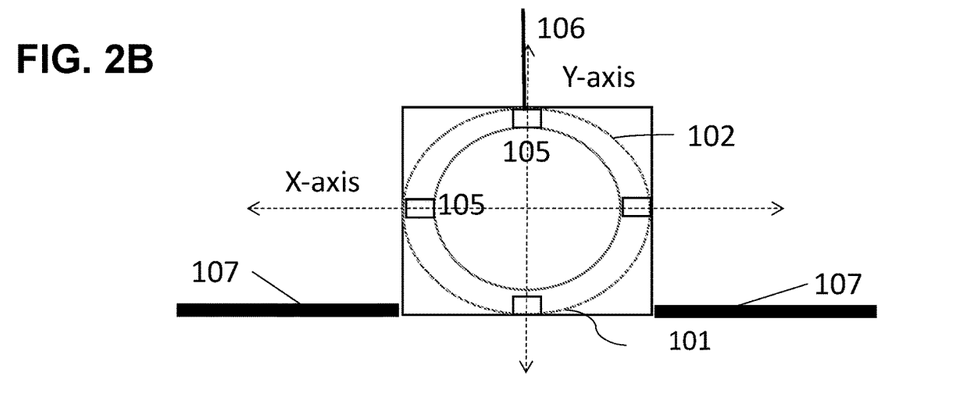
FIG. 2B illustrates a side view of a CODMS satellite according to an embodiment.

FIGS. 2A and 2B illustrate a side view and an end view of a layout of a CODMS satellite in accordance with an embodiment. As shown therein, the CODMS satellite 100 includes opposing thrusters 101, 102, here sized to include large fuel tanks, a computer or circuitry 103 for control of the thrusters, analysis of sensor outputs, on-board machine learning, communication and other operational processes, sensors 105 of multiple types needed for the CODMS mission, e.g., sensors for detecting physical parameters of the orbital debris object and sensors for monitoring the operation of the satellite itself, antenna(s) 106 and solar arrays 107. Some common cubesat features are not called out in the diagram, such as attitude control for ease of understanding. The thrust F1 from a first thruster 101 and the thrust F2 from a second thruster 102, indicated by the large, dotted arrows may be equal or different based on a mission phase. There are numerous possible configurations for the thrusters, the antenna(s), the sensors.

When the thrusters 101, 102 are 180 degrees opposed and of equal strength, the force (F1) from thruster 101 cancels the force (F2) from thruster 102, so the CODMS satellite stays stationary near the orbital debris object. Particles from thruster 102 exhaust impact the surface of the orbital debris object imparting a force (F3) through momentum transfer that is approximately in the opposite direction of the velocity of the orbital debris object. This creates a small deceleration of the orbital debris object. F3 will likely be less than F2 as some exhaust particles will miss the orbital debris object, or bounce off in directions that impart little force. Over time this deceleration will drop the orbit of object where there is more significant atmosphere, leading to increased drag that will lead to the object's deorbiting and the elimination of the object as an orbital debris risk threat to operational satellites and space craft in LEO. This is altitude is often considered to be 200 km.

Figure 3:
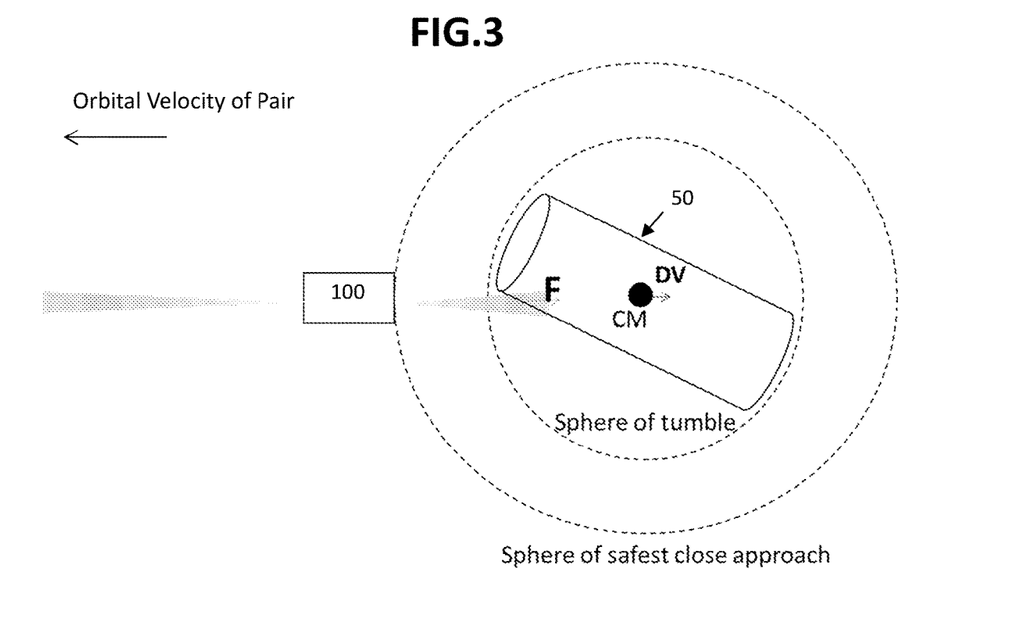
FIG. 3 illustrates a CODMS satellite approaching an orbital debris object.

FIG. 3 illustrates an example of a CODMS satellite 100 paired with an orbital debris object 50 according to an embodiment. When the momentum transfer does not cross directly through the Center of Mass (CM) some of the momentum will go into slowing the orbital velocity of the orbital debris object and some will induce a rotation around the CM. This can be used to change the attitude of the Orbital Debris Object 101, 102 and fine attitude control will allow the CODMS Satellite 100 keep within an optimal (but safe) distance of the orbital debris object 50. For example, the CODMS satellite 100 may be positioned at the outer edge of the sphere of safest close approach sufficiently removed from the sphere of tumble of the orbital debris object 50 so that it will avoid contact with the orbital debris object 50. The CODMS satellite 100 may be positioned ahead of the orbital debris object 50. When the momentum transfer from the CODMS satellite 100 is through the Center of Mass (CM) of the orbital debris object 50, most of the momentum will go into slowing the orbital velocity of the orbital debris object 50.

Figure 4:
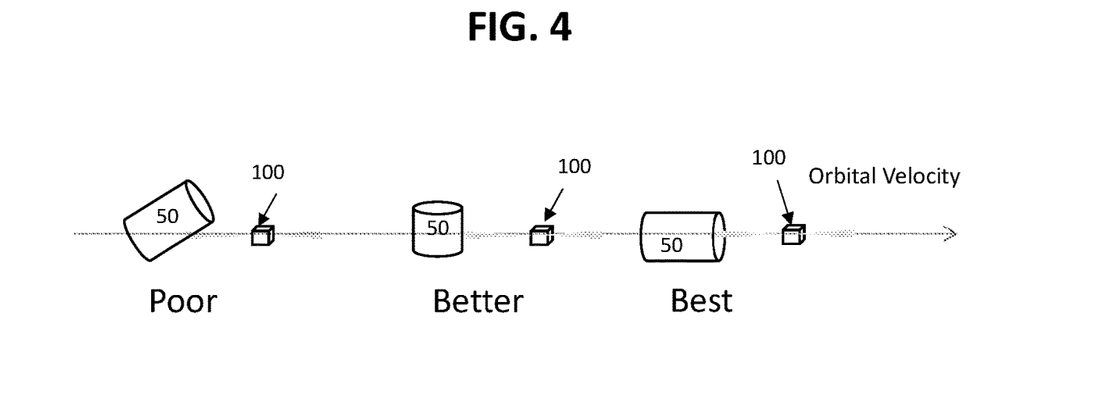
FIG. 4 illustrates a CODMS satellite interacting with an orbital debris object.

The more aligned the thrust exhaust from the CODMS satellite 100 is to the normal of the impact surface on the orbital debris object 50 opposite of the desired ΔV vector, the more efficient the momentum transfer. As shown in FIG. 4, the CODMS 100 may rotate the orbital debris object 50 to place the orbital debris object 50 in an optimal position for maximizing momentum transfer. Thruster exhaust from the CODMS 100 that bounce off the normal surface of the orbital debris object 50 should impart more ΔV than those that simply stick.

Figure 5:
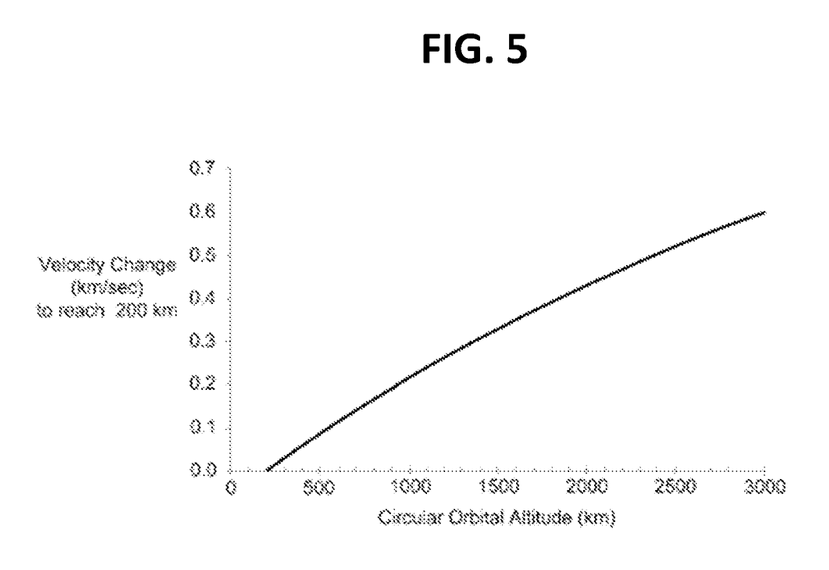
FIG. 5 illustrates a plot of velocity change for an object in LEO needed to reach 200 km given the original altitude of its circular orbit.

FIG. 5 illustrates estimated velocity change for orbital decay of space debris as a function of circular orbital altitude. In particular, FIG. 5 shows the change in velocity (ΔV) generally needed to drop an object in LEO down to 200 km. The higher the original orbit the higher the ΔV needed, and the greater the fuel needed. The CODMS satellite will need to apply thrust from T1 to also decelerate to keep it close to the orbital debris object. For example, a velocity change of 0.7 km/second is expected to lower debris from a residence altitude as high as 3,000 km to an altitude at which orbital re-entry is certain. For debris at an altitude of 1,000 km, a velocity change of less than 220 m/sec is expected to hasten orbital decay.

$$\Delta v = v_e \ln \frac{m_0}{m_f} = I_{sp} g_0 \ln \frac{m_0}{m_f},$$

where:
$v_n = I_{sp} g_0$ is the effective exhaust velocity;
$I_{sp}$ is the specific impulse in dimension of time;
$g_0$ is standard gravity;
ln is the natural logarithm function;
$m_0$ is the initial total mass, including propellant, a.k.a. wet mass;
$m_f$ is the final total mass without propellant, a.k.a. dry mass.

Figure 6:
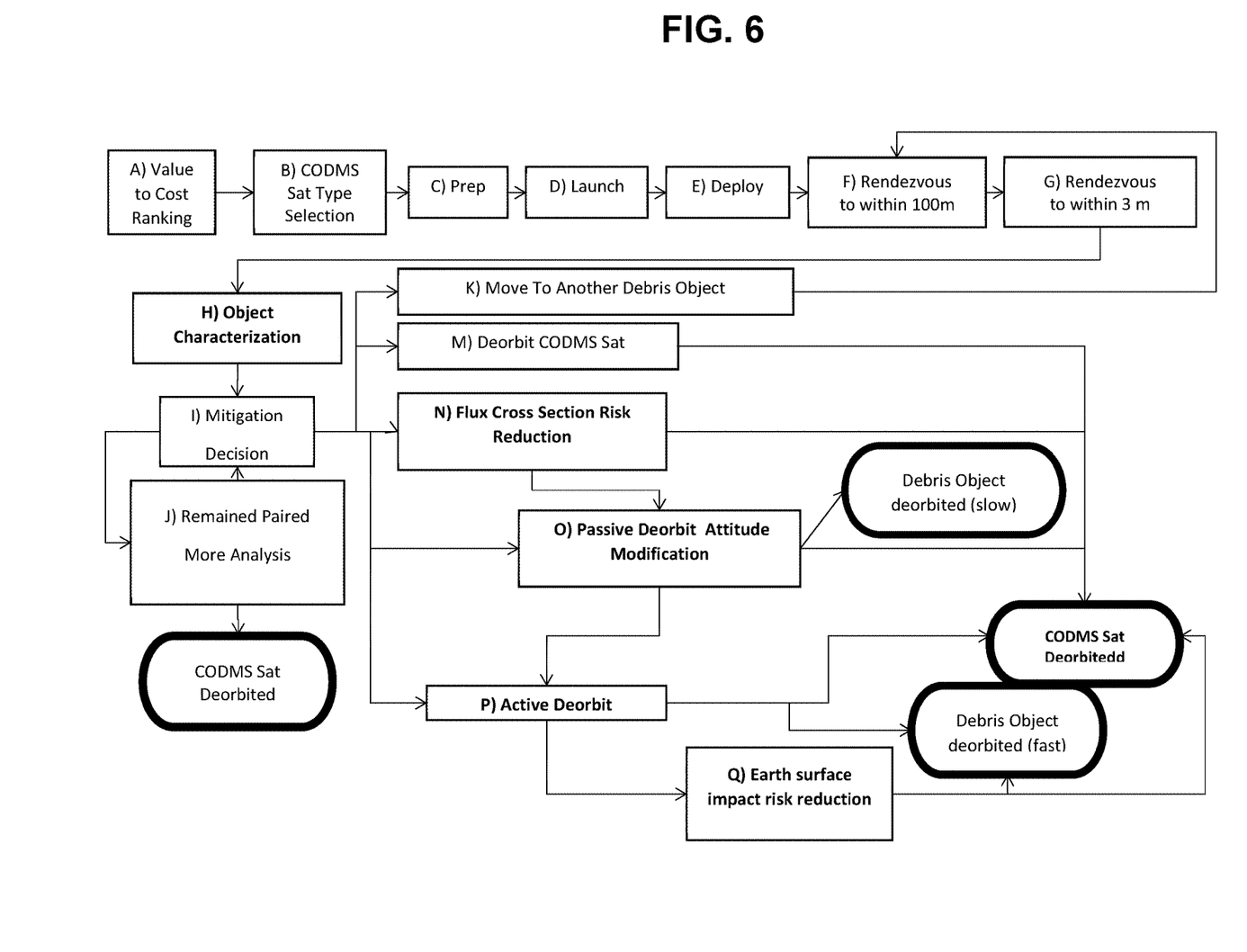
FIG. 6 illustrates a flow chart of CODMS services according to an embodiment.

FIG. 6 illustrates a flowchart of method of deorbiting objects in accordance with an embodiment. CODMS mission planning, operations and post mission review will use a great deal of data that will be stored in a series of Relational Databases that will be hosted in a computing cloud service. Custom software will be written and tested to CRUD (Create, Read, Update and Delete) various types of data to and between these databases. The following databases may be used:

(1) All Debris Objects Databases: Data outside CODMS, such as from LEO Labs or Privateer (orbital debris tracking businesses), that maintains the orbits of many orbital debris objects will be accessed with webservices. All data on Orbital debris targets within the expected or actual orbit of the CODMS Satellite will be collected via webservices calls to orbital debris tracking business and stored within the CODMS Planning, Operations (POS) database.

(2) CODMS Planning, Operations Software (POS): Tools to plan, simulate and operate missions (sends select CODMS operational data to the All Debris Objects Databases.

(3) CODMS Lessons Learned Database (LLD): Separable compilation of lessons learned (interacts with CODMS POS).

(4) CODMS Debris Object Characteristics Catalog: Separable compilation of debris object data accumulated from CODMS missions (interacts with CODMS POS, LLD).

As illustrated in FIG. 6, a mission of the CODMS 100 may start with operation A), in which orbital debris objects are analyzed. For example, there may be 10,000+ objects of potential concern, but some have higher risk of causing problems. This must be matched to the abilities of the different designs of CODMS available for use and potential revenue for mission success. OUTPUT: Mission Target.

Based on the mission target output in A) the mission may proceed to operation B) to determine the CODMS to be used in the mission. CODMS may be designed with a variety of satellite size, types and fuels to apply to different mission targets. Based on the CODMS Lessons Learned Database and decision support algorithms, the best pairing of CODMS Satellite design is selected. OUTPUT: CODMS Satellite Design.

In operation C), a specific CODMS Satellite is built, fueled and tested based on the selected CODMS Satellite Design. OUTPUT: CODMS Satellite.

In operation D), a launch provider is selected, the CODMS Satellite is delivered per launch provider specifications. OUTPUT: CODMS Satellite in LEO at the proper orbit.

In operation E), at a suitable correct time, the CODMS Satellite is deployed from the launch provider's payload framework. OUTPUT: CODMS Satellite is free flying in LEO.

In operation F), a current trajectory to a current target, e.g., the best trajectory and the best target, which may have changed since it can be many months from Mission Target selection to Launch, are determined and instruct the computer 103 to control the CODMS Satellite to move towards the current target along the current trajectory. Data from numerous missions may be used as at training set for machine learning to determine these, but initially may be determined by operators of the mission. After a period of time, likely between weeks and months, the CODMS satellite approaches to within a first distance, e.g., 100 m of the current target. At this point sensors on the CODMS satellite are activated to take over for final close approach. OUTPUT: CODMS Sat within first distance from Mission Target In operation G), the close approach to a predetermined safe distance, e.g., 3 m, from the sphere of tumble of the current target may be monitored. The computer 103 of the CODMS satellite may constantly monitor a distance from the current target and may automatically back away from the target object as needed. OUTPUT: CODMS Sat within approximately 3 m from Mission Target.

Figure 7:
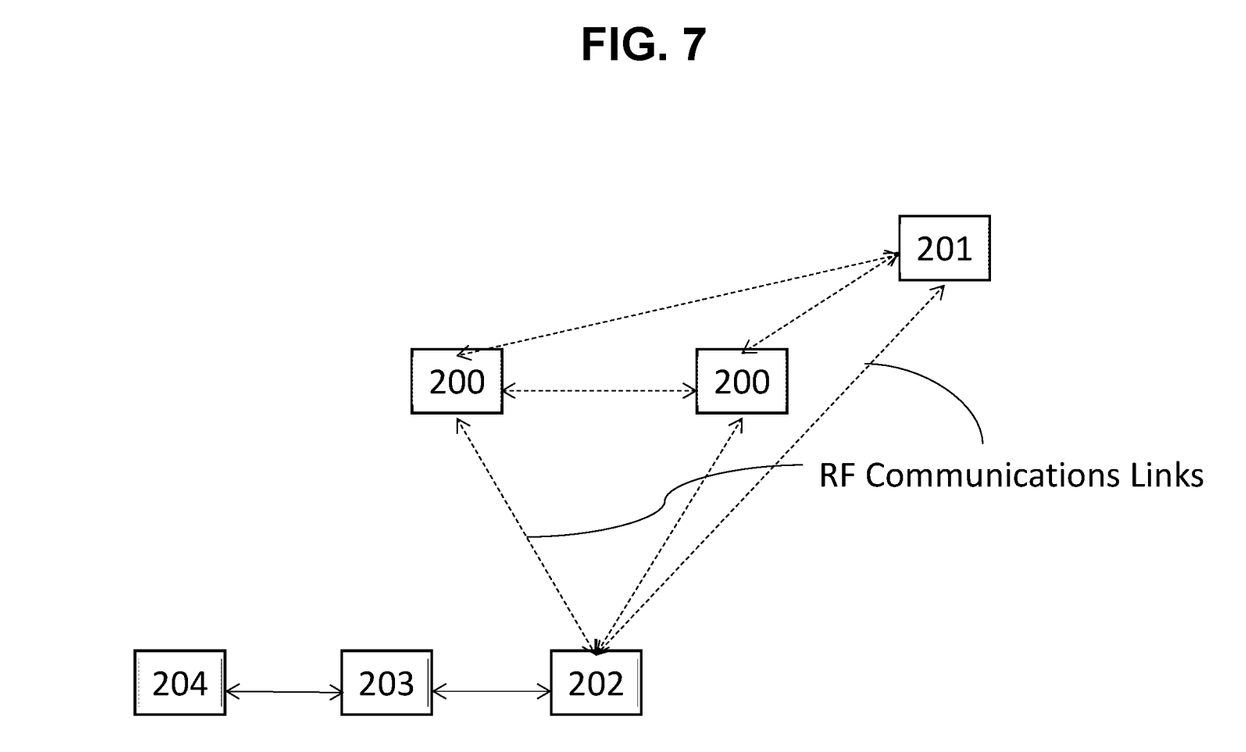
FIG. 7 illustrates CODMS Integration with Ground Systems, Human Interface according to an embodiment.

An overview of communication between the ground/cloud and launched CODMS satellites is illustrated in FIG. 7. CODMS Satellites 200 (One to Many) may communicated with other satellites 201, e.g., a target, with other CODMS satellites 200, and/or ground station 202. The ground station 202 is in communication with a computing center 203 (One to Many) that may host CODMS planning software for operations A) to G), as well as in conjunction with the computer 103 on the CODMS satellite 200 to perform remaining operations. Data collection being sent from the CODMS Satellites 200 to the computing center 203 and control from the computing center 203 to the CODMS satellites may be along different paths, as needed.

In operation H), based on previous finding and population of the CODMS Object Character History Database, the computer 103 on the CODMS satellite may use a scripted combination of continuous sensing with several types of sensors (optical, IR, RADAR, LIDAR) for gathering information about the object 50 and well timed application of thrust from the opposite facing thrusters to the object 50 to create a detailed 3D model (with moments of inertia, tumbling rotation rate an axis) and surface quality estimate of the target object. Surface quality of the target may be important, since a highly degraded painted and/or insulated surface might flake off paint or insulation with even low thrust momentum transfer. Thus, the thrust may be applied to the least degraded surface. There is also a possibility that what was expected to be a single object is multiple objects. Thus, object characterization may include tumbling components, surface conditions, moments of inertia, number of objects actually present, and so forth. While orbital debris may currently be characterized at low resolution, i.e., there are no close-up images of orbital debris sufficient to determine best risk mitigation strategies. Further, most orbital debris does not have a way to broadcast its position to aid in collision avoidance. The computer 103 on the CODMS satellite uses outputs from a combination of sensors 105 very close to the target object (a few meters) and timed pulses of momentum on debris object surface to learn and build a model of debris object expected behavior. The applying of a timed thrust pulse and then sensing the target object may be repeated a number of times and the results thereof stored in the computer 103 until the computer 103 has generated the model. OUTPUT: Debris Object Model (s).

In operation I) the Debris Object Model is reviewed one of a number of possible interactions is selected. Data from numerous missions, e.g., stored in the databases, may be used as at training set for machine learning to determine the desired interaction, but initially this may be determined by operators of the mission. OUTPUT: Mitigation Decision.

If the Mitigation Decision is to obtain more data, operation J) is performed, while feeding back data to operation I). OUTPUT: Improved Debris Object Model (s).

If the Mitigation Decision is to move to another Debris Object, the flow returns to operation F to rendezvous with a new target.

If the Mitigation Decision is that additional time at this Orbital Debris Object will not be productive and there are no other Orbital Debris Objects accessible with fuel left in the CODMS Satellite (which must retain its reserve of self-deorbit fuel) or simply when there is insufficient fuel left, as estimated by the thrust history and the CODMS satellite's reaction to thrust events by the computer 103, the CODMS Satellite will be deorbited in the fastest way possible in operation M). Such deorbiting may be automatically performed by the CODMs Satellite. OUTPUT: Deorbited CODMS Satellite, additional lessons learned, mission termination.

If the Mitigation Decision is to use the CODMS Satellite thrusters to change the attitude of the current target to lower the risk of collision with other objects in LEO, the flow proceeds to operation N). Object attitude is determined by a sensor 105, e.g., a video camera, and the computer 103 determining the primary axis of the orbital debris objects, then estimating what the angles of these axis are to the local coordinate space which puts LOCAL-Z as altitude and LOCAL-X as the direction of travel. The computer 103 may use video camera observations to estimate what set of angles are best to create a minimal cross section in the LOCAL-Y direction to minimize the cross section to crossing orbital debris flux. OUTPUT: Collision Risk Reduction, Refined 3D Debris Object Model, Lessons Learned.

If the Mitigation Decision is to use the CODMS Satellite thrusters to increase the surface area of the target object with respect to the target object velocity, the flow proceeds to operation O) to passively deorbit the target object. OUTPUT: educed Debris Object Orbital Life (Risk Reduction), Refined 3D Debris Object Model, Lessons Learned.

If the Mitigation Decision is to use the CODMS Satellite thrusters to directly apply momentum transfer to the surface of the target object normal to its direction of travel, the flow proceeds to operation P) to actively deorbit the target object. The thrust for operation P will be higher than that of object characterization of operation H and attitude adjustment of operation N, which requires numerous short thrust events, e.g., 0.1 seconds, while operation P uses longer thrust event, e.g., 2 second. The active deorbit may be timed to provide the maximum safe momentum transfer, as well as modification of orbit that maximizes the introduction of more atmospheric drag. The particular timing will depend on the specific CODMS satellite deployed. OUTPUT: Faster Reduced Debris Object Orbital Life (Risk Reduction), Refined 3D Debris Object Model, Lessons Learned.

If the Mitigation Decision is to enhance the Debris Object breakup when the CODMS Satellite and Debris Object pair are a very low altitude (e.g., 200-300 km) during the active deorbit operation P, the flow proceeds to operation Q), in which the computer 103 controls the CODMS Satellite to back a sufficient distance away from the target object to obtain a maximum momentum transfer given a remaining fuel estimate. Then the computer 103 may use all the remaining fuel to ram the target object at an optimal place on the target object to create the best potential for Debris Object breakup. Even if additional breakup is not achieved, there may be a shape change that can enhance the amount that will burn up on re-entry. OUTPUT: Reduced Risk of Debris Object Remaining Intact to Earth Surface (Risk Reduction), Refined 3D Debris Object Model, Lessons Learned.

More than one operation J-K and N-P may be performed during the mission. For example, information gathered during operation J may be used to generate another mitigation decision in operation I, e.g., operations K or N-P Also, during any close interactions with the target object, e.g., operations J and N-P, these operations further may include monitoring the distance between the CODMS satellite and the target object and thrusting as needed, including collision avoidance. For example, if the CODMS satellite is within a 1-2 m distance of the sphere that describes the outer edge a tumbling orbital object describes over time, the thruster may be fired to maintain the predetermined safe distance.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

The invention claimed is:

1. A method for capture-less management of an orbital debris object, the method comprising:
controlling a satellite having opposing thrusters to be within a predetermined distance of the orbital debris object, wherein the opposing thrusters include at least one pair of thrusters on opposite sides of the satellite that fire in opposite directions at equal strength;
controlling the opposing thrusters to maintain the predetermined distance between the satellite and the orbital debris object;
characterizing the orbital debris object;
determining a mitigation strategy to manage the orbital debris object from among a plurality of mitigation strategies based on the characterizing; and
controlling the opposing thrusters to execute a determined mitigation strategy for the orbital debris object by momentum transfer to the orbital debris object.

2. The method of claim 1, wherein controlling the opposing thrusters includes changing an attitude of the orbital debris object.

3. The method of claim 1, wherein controlling the opposing thrusters includes transferring momentum to the orbital debris object.

4. The method of claim 3, wherein transferring momentum includes controlling the opposing thrusters includes applying force through a center of mass of the orbital debris object.

5. The method of claim 1, further comprising wherein characterizing the orbital debris object includes:
first sensing physical properties of the orbital debris object, wherein controlling the opposing thrusters includes applying a timed thruster pulse to impart force to the orbital debris object;
second sensing physical properties of the orbital debris object, after force has been applied; and
machine learning a model of the orbital debris object based on the first and second sensed physical properties.

6. The method of claim 5, further comprising determining further control of the opposing thrusters based on the model.

7. The method of claim 5, wherein the first and second sensing include sensing at least one of a surface condition of the orbital debris object, moments of inertia of the orbital debris object, tumbling of the orbital debris object, and a number of separate elements of the orbital debris object.

8. The method of claim 5, wherein applying the timed thruster pulse includes applying a plurality of timed thruster pulses and second sensing includes second sensing after each applied timed pulse.

9. The method of claim 1, wherein controlling the opposing thrusters includes ramming the orbital debris object.

10. The method of claim 1, further comprising receiving communications from operators to provide the satellite with instructions for controlling the satellite.

11. The method of claim 1, wherein maintaining the predetermined distance is automatic.

12. The method of claim 1, further comprising automatically deorbiting the satellite on condition that a predetermined estimated fuel estimate is reached.

13. The method of claim 1, wherein the plurality of mitigation strategies includes at least two of active deorbit of the orbital debris object, passive deorbit of the orbital debris object, and passive deorbit of the orbital debris object.

14. A capture-less orbital debris management system satellite for capture-less management of an orbital debris object, the satellite comprising:
opposing thrusters that include at least one pair of thrusters on opposite sides of the satellite that fire in opposite directions at equal strength;
sensors; and
control circuitry configured to
control the opposing thrusters to maintain a predetermined distance between the satellite and the orbital debris object;
determining a mitigation strategy from among a plurality of mitigation strategies in accordance with output from the sensors; and
control the opposing thrusters in accordance the determined mitigation strategy to manage the orbital debris object by momentum transfer to the orbital debris object.

15. The satellite of claim 14, wherein fuel for the opposing thrusters is non-toxic.

16. The satellite of claim 14, wherein the control circuitry is configured to control the opposing thrusters to change an attitude of the orbital debris object.

17. The satellite of claim 14, wherein the control circuitry is configured to control the opposing thrusters to transfer momentum to the orbital debris object.

18. The satellite of claim 16, wherein the control circuitry is configured to control the opposing thrusters to apply force through a center of mass of the orbital debris object to transfer momentum to the orbital debris object.

19. The satellite of claim 14, wherein the control circuitry is configured to:
store physical properties of the orbital debris object output from the sensors at a first time;
control the opposing thrusters to apply a timed thruster pulse to impart a force to the orbital debris object;
store physical properties of the orbital debris object at a second time, after momentum has been applied; and
machine learning a model of the orbital debris object based on the physical properties sensed at the first time and the second time.

20. The satellite of claim 14, wherein the control circuitry is configured to estimate remaining fuel estimate based on a combination of thrust history and the reaction of the satellite to thrust events, and automatically deorbit the satellite on condition that a predetermined remaining fuel level or less is estimated.

21. The satellite of claim 15, wherein fuel is water.

22. The satellite of claim 14, wherein the plurality of mitigation strategies includes at least two of active deorbit of the orbital debris object, passive deorbit of the orbital debris object, and passive deorbit of the orbital debris object.

* * * * *